Jan. 9, 1968  G. CARNIELLI  3,362,724
TANDEM-TYPE BICYCLE
Filed Dec. 20, 1965

INVENTOR.
Guido Carnielli
BY
Michael J. Striker

United States Patent Office 3,362,724
Patented Jan. 9, 1968

3,362,724
TANDEM-TYPE BICYCLE
Guido Carnielli, 28 Piazza Luigi di Savoria, Milan, Italy
Filed Dec. 20, 1965, Ser. No. 514,930
Claims priority, application Italy, Dec. 24, 1964,
6,967/64
5 Claims. (Cl. 280—231)

ABSTRACT OF THE DISCLOSURE

A tandem bicycle having a frame formed by two longitudinally aligned similar front and rear components and each consisting of one tubular member having an upwardly inclined fore part, a straight rearwardly inclined rear part and a lower upwardly curved middle part, in which the front end of the rear component is integrally secured to the rear part of the fore component, and in which the frame connects the rear fork in which a rear wheel is turnably mounted to a tubular member in which a front fork carrying a front wheel is steerably mounted, whereas front and rear pedal means drivingly connected to the rear wheel are turnably supported on the frame in the region of the curved middle parts of the front and rear components thereof.

---

This invention is generally concerned with bicycles and, more particularly, it is concerned with a new and improved two-seater bicycle of the so-called "tandem" type, that is with a bicycle provided with two saddles, two pairs of handles and two rotary pedal assemblies arranged in and spaced along the bicycle's longitudinal plane of symmetry for accommodation and riding of the bicycle by two persons.

A principal object of this invention is to provide a new and improved tandem bicycle which, as compared with conventionally constructed and dimensioned tandems, is of surprisingly small dimensions and simple structure, while being fully adapted to be properly made use of and ridden by fully grown and tall gentlemen. In particular the improved bicycle of this invention is characterized by the provision of handle bars and saddle pillars so constructed and combined with the frame components of the bicycle that said bicycle can be readily partially in-folded to reduce the overall dimensions thereof within so small limits that the same may be stored and transported into a regular automobile baggage compartment or carried into railway car compartments. The improved tandem bicycle of the invention is further characterized by the provision, the configuration and the arrangement of handle bars and saddle pillars shaped, constructed and arranged so that such components can be readily adjusted as to their relative location, level and spacing for individually adapting each one of the two riders' accommodations for comfortably accommodating gentlemen and ladies riders of different stature and corpulence, and even boys and girls riders. The new tandem bicycle of the invention is further characterized by its general structural arrangement which, while the bicycle is of exceptionally reduced overall length as compared with conventionally constructed tandems, it is quite properly balanced and safely roadable.

Figure 1:
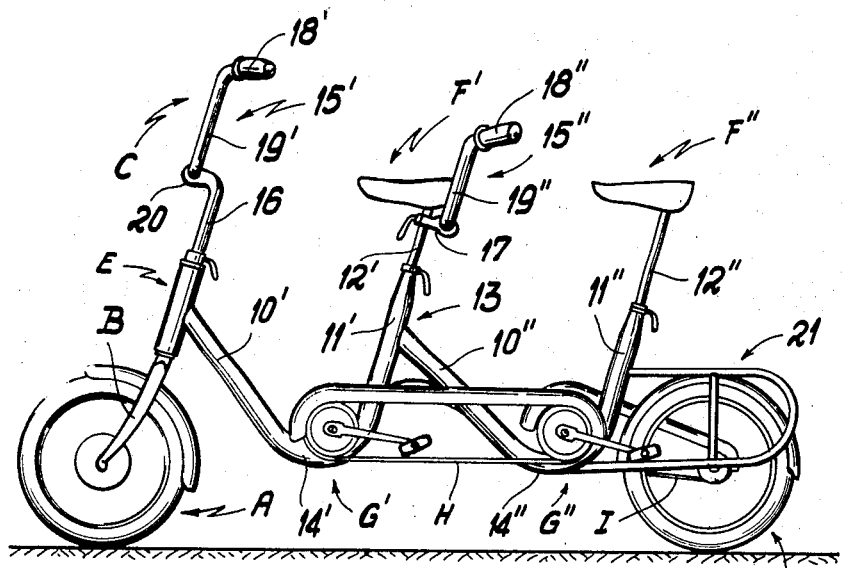
Figure 2:
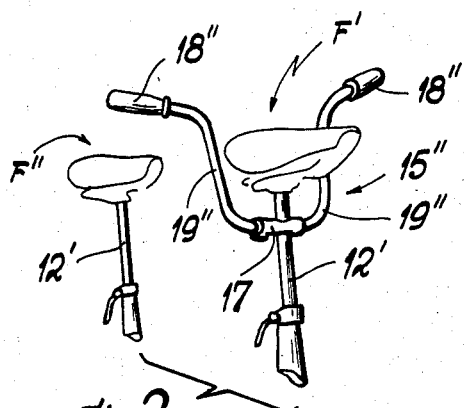

These and other objects and advantages of this invention will be apparent to those skilled in the art from the following detailed description when taken in conjunction with the accompanying drawings, forming an essential component of this disclosure, and wherein:

FIGURE 1 is a side elevational view of a preferred embodiment of the invention, and FIGURE 2 perspectively and diagrammatically shows the essential features and the arrangement of the saddles and saddle pillars and of the rear handle bar.

Referring now to the drawings, wherein the structural details of the various devices and means which, as individually considered, are well known in the art and conventional in a bicycle structure have been omitted: according to a generally conventional arrangement, the tandem bicycle comprises a steerable front wheel generally indicated at A, supported for free rotation between the side components of a steerable front fork B steerably connected to the front handle bar assembly C, a rear wheel D, and a frame lengthwise extending from a nearly vertical tubular component E, wherein the tubular upper part of said fork B is rotatably seated, to the rear fork structure to which the rear wheel shaft is secured. The said frame is designed to support a front and a rear saddle F' and F", respectively, and front and rear pedal assembly G' and G", located below said saddles F' and F", respectively. A transmission chain H is arranged to drivingly connect the said fore pedal assembly G' to the rear assembly G", and another transmission chain I is provided to drivingly connect the rear wheel D to the said rear pedal assembly G".

In the improved bicycle of the invention, both said front and rear wheels A and D are of diameter noticeably less than the diameter of conventional bicycles, in particular said front and rear wheels have an overall diameter not greater than 52 centimeters about, and the lengthwise spacing between the axis of the rear wheel D and the rear saddle F" is not greater than 24 centimeters about. As a consequence thereof, it might be assumed that the weight of the bicycle rider seating on the rear saddle is nearly entirely carried by said rear wheel.

It has been however found that, upon the combination of the fact that both bicycle riders maintain a substantially forward bowed attitude and of the fact that a substantial part of weight of both riders is carried by the handle bars and by the pedals, such arrangement of parts provides an unexpected balance of weight on the tandem bicycle wheels and ensures a quite safe ride in particular when steering along a curve, notwithstanding the extremely short interval between the axes of front and rear wheels A and D.

The frame structure of the tandem bicycle essentially consists of two aligned parts of nearly equal configuration and individually formed by one steel tube. Such parts comprise each a fore upwardly inclined straight portion 10' and respectively 10", a rear slightly rearwardly inclined straight portion 11' and respectively 11", wherein the saddle pillars 12' and 12" are axially fitted, the fore portion 10" of the rear part being integrally secured at 13, such as by welding, to the rear portion 11' of the fore part. Each of said parts include a curved lower intermediate portion 14' and respectively 14", to which the tubular hubs (not shown) of the shafts of pedal assemblies G' and G" are secured. The said structure of the configuration shown in FIG. 1 has been found as quite rigid under torsional stresses while substantially resilient upon the loads applied to said saddles F' and F", as a result of the resiliency of its curved portion 14' and 14", to ensure a noticeable shock absorbing ability and comfortable ride.

The tandem bicycle of the invention is further provided with handle bars of essentially equal configuration, said handle bars being generally indicated at 15' and 15", and the said configuration is shown in FIG. 2. The fore handle bar 15' is adjustably supported at the upper end 20 of a straight tubular pillar 16 which is axially fitted and adjustably secured within the upper tubular part of fork B, within the said part E of the frame. The clamp or holdfast devices used for adjustably securing the handle bar pillar 16 within the upper part of the steerable fore fork of the bicycle are not shown in the drawing as said devices are well known in the bicycle manufacture. It is however herein pointed out that said pillar 16 is dimensioned to be, upon request, nearly fully telescoped within said frame part E, so that an at least 20 centimeter variation of level of the front handle bar C may be provided upon vertical adjustment, that is by adjustingly telescoping of said pillar 16.

The rear handle bar 15″ is at its turn adjustably secured to a brace support 17 which is adjustably clamped to the force saddle pillar 12′, and therefore the level of said rear handle bar can be adjusted within the vertical interval corresponding to the length of said pillar 12′ between the saddle F′ and the upper end of the part 11′ of the frame, the amplitude of said adjustment being therefore proportional to the level at which said fore saddle F′ has been adjusted and set. Said arrangement of parts leads to a somewhat dependency of the adjustment of the height at which the rear handle bar 15″ can be set from the adjusted level of fore saddle F′. Such dependency ensures that a tall and corpulent person cannot accommodate himself on the rear set at a nearly upright attitude when the fore seat has been adjusted for a lightweight person short in stature, such as a child (such occurrence would lead to dangerous unbalance of weight on the wheels and lack of adherence of the front wheel on the ground).

The particular shape of the handle bars is shown in FIG. 2, with reference to rear handle bar 15′. Each handle consists of a length of metal tube having outwardly extending upper portions provided with conventional grips 18′ and respectively 18″, upwardly directed side portions 19′ and respectively 19″ and a lower straight center portion fitted for rotation about its axis at the upper end 20 of pillar 16 and respectively to the said brace 17. Conventionally constructed clamp means (not shown) are provided at 20 and 17 for holding fast the said handle bars at the desired angular position about the horizontal transversal axes defined by their respective center portions. The said side portions 19′ and 19″ are preferably at least 20 centimeters long, so that said grips 18′ and 18″ are located at a level substantially higher than the level of said axes at 20 and respectively at 17, when the tandem bicycle is set for riding thereon, as shown in the drawing.

Such shape and arrangement of handle bars lead to two important advantages: upon releasing of said clamp means at 20 and at 17, both handle bars can be fully down-turned so that, whilst said pillars 16, 12′ and 12″ are fully downwardly telescoped within parts E and respectively 11′ and 11″, the overall height of the bicycle can be reduced to half about of its overall height when set for riding thereon, to facilitate storage and transportation. Upon rotation of said handle bars about the upwardly direction thereof, shown in the drawing, the horizontal spacing between the grips and the saddles may be adjusted for individual adaptation of either seat to accommodate persons of different statures and arm-lengths, and for preferred more or less forwardly bowed attitude of the bicycle riders.

According to a further feature of the improved tandem bicycle, the said rear wheel D thereof is structurally connected to the bicycle frame by means of a structure subassembly, generally indicated at 21 in FIG. 1, having a nearly horizontal upper part located adjacent to and just above said wheel, and adapted to provide a suitable support for a parcel grid or similar container.

Although the present invention has been described with specific details of one preferred embodiment thereof, it is not intended that such details be limitations upon the scope of the invention except insofar as set forth in the appended claims.

I claim:
1. A tandem bicycle comprising, in combination, a steerable front wheel secured to a steerable front wheel assembly including a front wheel fork, a front handle bar and a handle bar pillar adjustably and telescopingly secured in said front wheel fork; a rear wheel secured to a rear fork; a frame connecting said rear fork to a tubular component in which said front fork is steerably supported, said frame comprising two longitudinally aligned similar front and rear components each consisting of one tubular member having an upwardly inclined fore part, a slightly rearwardly inclined straight rear part and a lower upwardly curved middle part, the fore end of said rear component being integrally secured to the rear part of said fore component; a front and a rear pillar respectively adjustably and telescopingly fitted in said straight rear parts of said fore and rear components; a front and rear saddle respectively supported on said front and rear pillars; a rear not steerable handle bar connected to said front pillar; front and rear pedal means respectively arranged substantially below said front and rear saddles and supported for rotation by said frame; and transmission means drivingly connecting both of said pedal means to said rear wheel.

2. A tandem bicycle as defined in claim 1, wherein said front and rear handle bars comprise each a transverse straight center portion defining a transverse horizontal axis about which the handle bar can be adjustably rotated, two symmetrical side portions extending radially with respect to said axis for at least 20 centimeters therefrom, and handgrip laterally extended symmetrical end portions.

3. A tandem bicycle as defined in claim 2, wherein said rear handle bar is adjustably connected for rotation about said axis to a brace member adjustably secured to the front pillar for displacement along said pillar below said front saddle.

4. A tandem bicycle as defined claim 1, wherein said front and rear pedal means are supported for rotation about axes adjacent to said lower curved parts of said front and respectively rear frame component.

5. A tandem bicycle as defined in claim 1 wherein said front and rear wheels have each a diameter not exceeding 52 cm., wherein the longitudinal distance between the axis of said rear wheel and said rear saddle does not exceed 24 cm., and wherein said rear handle bar is adjustably secured to said front pillar and so shaped that the grips of said rear handle bar are located at a level not higher than about 20 cm. above the actual level of said front saddle.

References Cited

UNITED STATES PATENTS

| 1,428,496 | 9/1922 | Villeneuve | 280—278 |
| 2,397,441 | 3/1946 | Schwinn | 280—231 |
| 2,495,859 | 1/1950 | Mennesson | 280—281 |
| 3,191,965 | 6/1965 | Wilkens | 280—231 |
| 3,195,923 | 7/1965 | Moulton | 280—281 |

FOREIGN PATENTS

| 628,783 | 6/1963 | Belgium. |
| 613,291 | 11/1948 | Great Britain. |

KENNETH H. BETTS, *Primary Examiner.*